United States Patent
Boltz et al.

(10) Patent No.: US 7,523,897 B2
(45) Date of Patent: Apr. 28, 2009

(54) DEVICE FOR FIXING A WIRE ON A LOAD BEARING ELEMENT PROVIDED WITH AT LEAST ONE OPENING

(75) Inventors: Roland Boltz, Estrees-Saint-Denis (FR); Stéphane Quertelet, Remy (FR)

(73) Assignee: I.C.M. Group, Montbard (FR)

( * ) Notice: Subject to any disclaimer, the term of this patent is extended or adjusted under 35 U.S.C. 154(b) by 40 days.

(21) Appl. No.: 10/548,074

(22) PCT Filed: Mar. 3, 2004

(86) PCT No.: PCT/FR2004/000498

§ 371 (c)(1), (2), (4) Date: Jan. 23, 2006

(87) PCT Pub. No.: WO2004/081391

PCT Pub. Date: Sep. 23, 2004

(65) Prior Publication Data
US 2006/0175472 A1 Aug. 10, 2006

(30) Foreign Application Priority Data
Mar. 6, 2003 (FR) .................................. 03 02784

(51) Int. Cl.
*F16B 15/00* (2006.01)
*F16B 45/00* (2006.01)
(52) U.S. Cl. .............................. 248/71; 248/65; 248/73
(58) Field of Classification Search ................... 248/65, 248/71, 73, 220.21, 220.31, 220.41, 220.43, 248/221.12, 221.11, 223.41, 224.51, 224.61, 248/222.41, 223.21
See application file for complete search history.

(56) References Cited

U.S. PATENT DOCUMENTS

| | | | | |
|---|---|---|---|---|
| 2,712,917 A | * | 7/1955 | Flora et al. | 403/397 |
| 2,918,240 A | * | 12/1959 | Wiegand | 248/71 |
| 3,098,273 A | * | 7/1963 | Cochran | 248/71 |
| 3,282,519 A | * | 11/1966 | Rheinstrom | 242/596.8 |
| 3,463,428 A | * | 8/1969 | Kindorf et al. | 248/72 |
| 3,565,385 A | * | 2/1971 | Zurawski | 248/343 |
| 3,583,663 A | * | 6/1971 | Snow, Jr. | 248/71 |
| 3,731,956 A | * | 5/1973 | Hanley | 52/481.2 |

(Continued)

FOREIGN PATENT DOCUMENTS

EP 0 725 467 8/1996

(Continued)

OTHER PUBLICATIONS

Translation of Japanese Office Action, Jan. 24, 2008, pp. 003/018-007/018.

*Primary Examiner*—Amy J. Sterling
(74) *Attorney, Agent, or Firm*—Young & Thompson

(57) ABSTRACT

The fixing device can be used to fix a wire (10) to a support member having a planar surface provided with at least two openings. The device is made of elastic sheet-metal and includes a cut-out body which is bent into a U-shape and includes a web (33) and two flanges (34) whose ends are T-shaped. At least one arm of the T-shape at each end is adapted to bear on the surface of the support member that is opposite the planar surface at the edge of an opening.

13 Claims, 2 Drawing Sheets

U.S. PATENT DOCUMENTS

| | | | | |
|---|---|---|---|---|
| 4,417,711 | A | * | 11/1983 | Madej ........................ 248/74.4 |
| 4,441,680 | A | * | 4/1984 | Rivkin et al. ........... 248/220.43 |
| 4,579,305 | A | * | 4/1986 | McKenzie ................. 248/68.1 |
| 4,961,553 | A | * | 10/1990 | Todd ........................... 248/62 |
| 5,149,027 | A | * | 9/1992 | Weber ....................... 248/68.1 |
| 5,713,157 | A | * | 2/1998 | van Leeuwen et al. ......... 52/39 |
| 5,852,854 | A | * | 12/1998 | Pierrot et al. ................. 24/297 |
| 6,161,804 | A | * | 12/2000 | Paske et al. ................ 248/74.1 |
| 6,354,543 | B1 | * | 3/2002 | Paske ........................ 248/68.1 |
| 6,497,395 | B1 | * | 12/2002 | Croker ....................... 248/300 |
| 2004/0144898 | A1 | * | 7/2004 | Spagnoli .................... 248/68.1 |

FOREIGN PATENT DOCUMENTS

| | | |
|---|---|---|
| EP | 1 039 198 | 9/2000 |
| JP | 43-13130 | 6/1968 |
| JP | 46-35470 | 12/1971 |
| JP | 50-1065 | 1/1975 |
| JP | 03-78834 | 8/1991 |
| JP | 05-026377 | 2/1993 |

* cited by examiner

DEVICE FOR FIXING A WIRE ON A LOAD BEARING ELEMENT PROVIDED WITH AT LEAST ONE OPENING

BACKGROUND OF THE INVENTION

The present invention consists in a fixing device for fixing a wire to a support member provided with at least two openings.

The problem often arises of having to fix a wire to a support member, for example to fix a welded wire mesh structure, for example a wire cable tray.

Wire mesh cable trays known in the art comprise wires of two different types, namely, and firstly, longitudinal wires, commonly called warp wires, which run longitudinally and in a rectilinear or quasi-rectilinear manner the whole of their length and, secondly, disposed transversely from place to place along these longitudinal wires, and being appropriately fixed thereto, U-shaped transverse wires, commonly called weft wires, the overall combination forming three panels, namely a bottom panel and two lateral panels, commonly called flanges, which are in practice plane or substantially plane.

These wire cable trays are routinely used, in the manner of a gutter, to support, house and protect electrical and like cables.

Here, and hereinafter, the term "electrical cables" means not only cables suitable for transporting and distributing electrical energy, but also cables and fibers adapted to transmit information electrically, optically or otherwise.

With reference to electrical cables, wire cable trays have many advantages that have made them popular with electrical installers, and in particular advantages of easy installation, and therefore economy, of flexibility, it being additionally possible to extract the electrical cables through any of their meshes, of transparency, and therefore easy identification of the electrical cables, of ventilation, of cleanliness, of safety, as much for the electrical cables as for users, and of performance.

It has already been proposed, for fixing this kind of mesh structure, for example in the document FR-A-2 697 690, to use a fixing section having a plane surface adapted to receive the bottom of the cable tray and provided with lugs adapted to cooperate with the bottom wires of the cable tray.

According to the above document, a sheet-metal fixing section has a plane surface on which longitudinal wires of a cable tray welded to U-shaped transverse wires rest. The plane surface of the section has at least two elongate openings formed by cutting out and bending the lugs. Before the fixing operation as such is carried out, the lugs are shaped to form a tongue that extends parallel to the plane surface of the section and at a distance from that plane surface globally equal to the diameter of the longitudinal bottom wires.

To fix the cable tray, it is placed on the plane surface of the section and moved in translation to place the bottom wires under the tongues of the lugs until they abut against the junction of the tongue with the plane surface of the section. The bottom wires repeat at predetermined intervals and the position of the lugs must of course correspond to those intervals. To complete the fixing operation, it suffices to bend the tongues of the lugs around the longitudinal bottom wires, toward the plane surface of the section, using any tool or preferably using an appropriate tool.

This way of fixing a mesh structure is satisfactory, but has several drawbacks: the section with lugs matches only one type of wire mesh cable tray, with which it is intended to cooperate, the distance between the lugs having to correspond exactly to that between the longitudinal wires of the cable tray. Moreover, it is necessary to have sections with lugs specific to one supplier.

SUMMARY OF THE INVENTION

An object of the present invention is to palliate this drawback. The present invention consists in a device for fixing a wire to a support member provided with at least two openings so that a single type of support member is suitable for fixing at least one wire, such as the longitudinal wires of a mesh structure.

We have also ensured that the wire fixing device matches a plurality of types of mesh structure in which the distances between the longitudinal wires are different.

We have also ensured that the fixing device can function regardless of the position of the support member and that the fixing operation is even simpler than before.

According to the invention, a fixing device that can be used to fix a wire to a support member having a planar surface provided with at least one opening, is characterized in that the device is made of elastic sheet-metal and comprises a cut-out body which is bent into a U-shape and comprises a web and two flanges whose ends are T-shaped, at least one arm of the T of each end being adapted to bear on the surface of the support member that is opposite the planar surface at the edge of an opening.

In one embodiment, each opening has a globally circular portion into which opens a narrow portion of elongate shape. In this embodiment, the crossbar of the T-shape of each of the flanges has a transverse width greater than the width of the narrow portion of each opening.

To simplify the fixing operation, the crossbar of the T-shape of each of the flanges preferably has on its edge an inclined portion to facilitate inserting it into an opening.

To adapt to diverse plane surfaces, the crossbar of the T-shape of each of the flanges advantageously has on one side on its edge facing toward the stem of the T-shape a notch defining a finger.

For fastening it, the crossbar of the T-shape has on one side a 90° return directed toward the opposite flange. The edge of the return preferably has an inclined portion to facilitate inserting the flange into an opening. For improved fixing, the edge of the return facing toward the stem may include a fastening tooth.

In one embodiment the web has over at least a portion of its length a central and very wide V-shape whose bottom includes a trough adapted to receive the wire to be fixed.

One particular application of the fixing device of the invention is to fixing a mesh structure conformed as a cable tray.

For example, the support member is a section forming an angle bracket, bracket, hanger or swing tray, etc. for fixing the bottom wires or the side wires of the cable tray to a vertical wall, posts, a ceiling.

The present invention also relates to a support member for a wire mesh cable tray comprising the combination of a support member having at least one opening on a plane face and at least one fixing device according to the invention.

The support member is preferably a U-section whose web incorporates the plane face provided with the openings. The free edges of the flanges or returns of the section advantageously have a rim defining channels adapted to receive the fingers of the fixing device. In this way, fixing to the web of the section and also to the opposite face of the section may be envisaged.

BRIEF DESCRIPTION OF THE DRAWINGS

To explain the invention better, an embodiment of the invention represented in the appended drawing is described next, by way of purely illustrative and non-limiting example.

In the drawing.

DESCRIPTION OF THE PREFERRED EMBODIMETS

Figure 1:
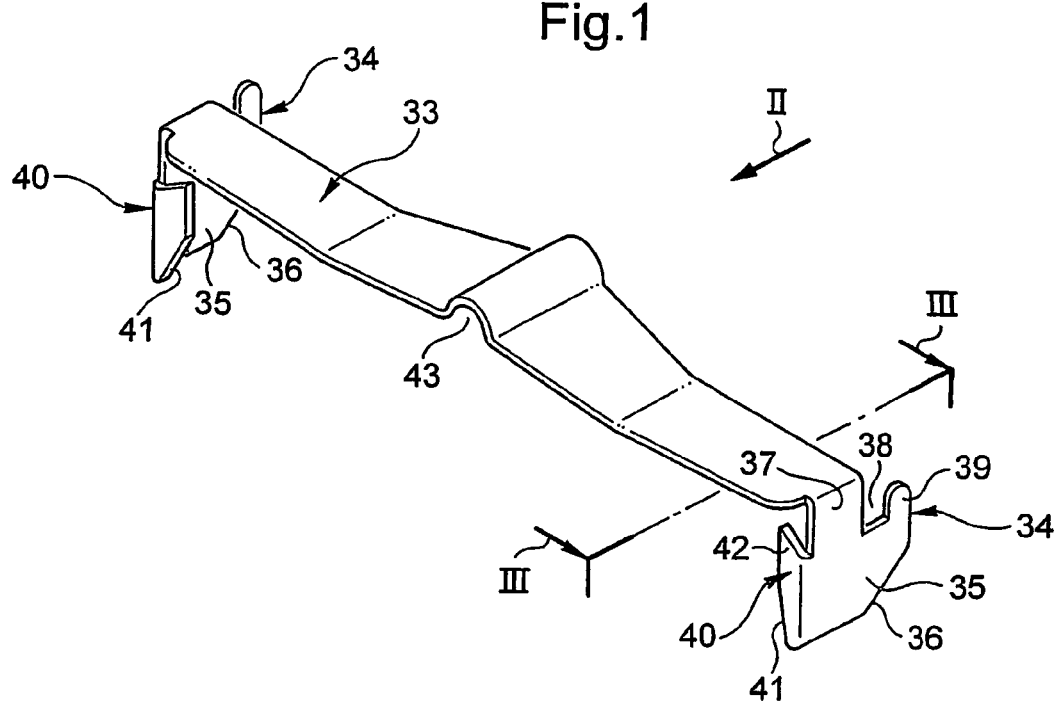
FIG. 1 is a perspective view of a fixing device of the invention.
Figure 2:
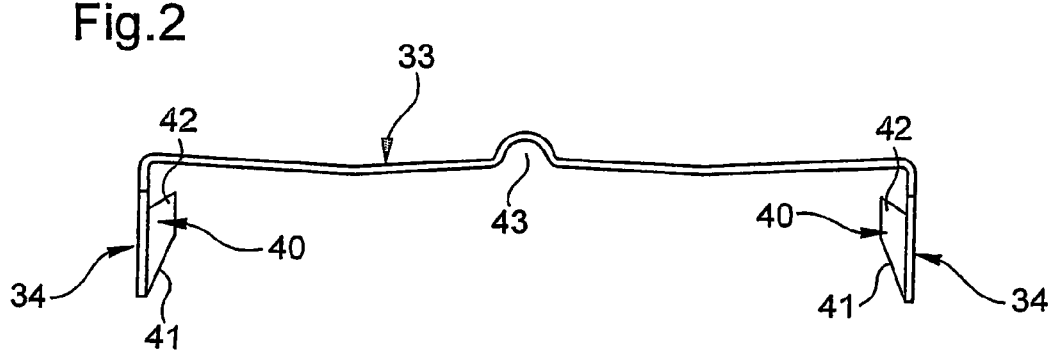
FIG. 2 is a view in elevation in the direction of the arrow II in FIG. 1.
Figure 3:
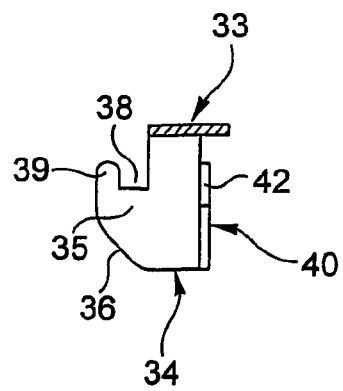
FIG. 3 is a view in section taken along the line III-III in FIG. 1.

FIGS. 1 to 3 show a fixing device of the invention that comprises a generally U-shaped cut and folded body comprising a web 33 and two flanges 34.

Each of the flanges 34 has a T-shaped end. The edge of the crossbar 35 of the T-shape facing the stem 37 of the T-shape includes a notch 38 defining a finger 39 and its opposite edge includes an inclined portion 36.

On the opposite side of the stem 37, i.e. on the side that is opposite the finger 39 in a transverse direction, the crossbar 35 of the T-shape has a 90° return 40 directed toward the opposite flange 34.

The edge of the return 40 has an inclined portion 41 and its edge facing toward the stem 37 of the T-shape includes a fastening tooth 42.

The web 33 of the body of the fixing device has a central and very wide V-shape over at least a portion of its length, with the concave side directed toward the flanges 34 of said body, the bottom of which has a trough 43 adapted to receive the wire 10 to be fixed.

Figure 4:
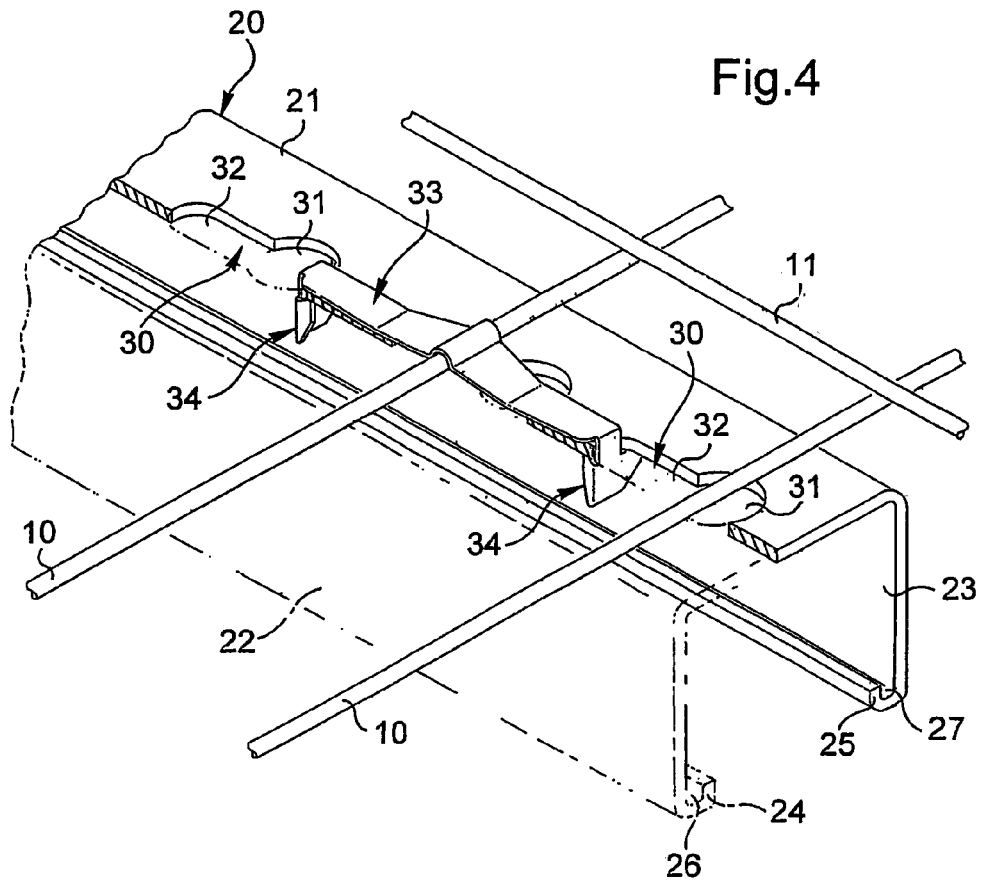
FIG. 4 is a diagrammatic perspective view, partly in section, showing the application of the device from FIGS. 1 to 3 to fixing a mesh cable tray.

FIG. 4 shows a support member 20 in the form of a U-section having a plane face 21 and two parallel returns 22, 23 perpendicular to the plane face 21. This section is generally used to support a globally solid or mesh structure that is fixed to it. Its plane face 21 is provided with two openings 30.

Each opening 30 comprises a portion 31 of globally circular shape into which opens a narrow portion 32 of elongate shape.

The crossbar 35 of the T-shape of each of the flanges 34 of the fixing device has a transverse width greater than the width of the narrow portion 32 of each opening 30.

The fixing device of the invention is adapted to fix to the section 20 a wire 10, to be more precise a wire mesh structure such as a cable tray, represented here by two longitudinal wires 10 and one transverse wire 11 defining part of the bottom of the cable tray.

The use of the fixing device of the invention follows from the above description. After placing the wire to be fixed on the plane face 21 of the section 20 (FIG. 4), the fixing device is laid thereon transversely, one of its ends is inserted into the circular portion 31 of an opening 30 (that on the right in FIG. 4), the flange 34 at that end engaging in this circular portion 31 on the side opposite the plane face 21. When the wire 10 has assumed its position in the trough 43, it suffices to push the fixing device laterally so that the end in question comes to face the narrow portion 32 and the other end of the fixing device is inserted into the circular portion 31 of another opening 30 (that on the left in FIG. 4), the inclined portion 36 facilitating this operation. The tooth 42 and the finger 39 at each end of the fixing device then bear on the interior face of the support member 20.

It is possible to replace the openings having a circular portion 31 and a narrow portion 32 by oblong openings of the same length whose width is equal to the diameter of the circular portion.

Figure 5:
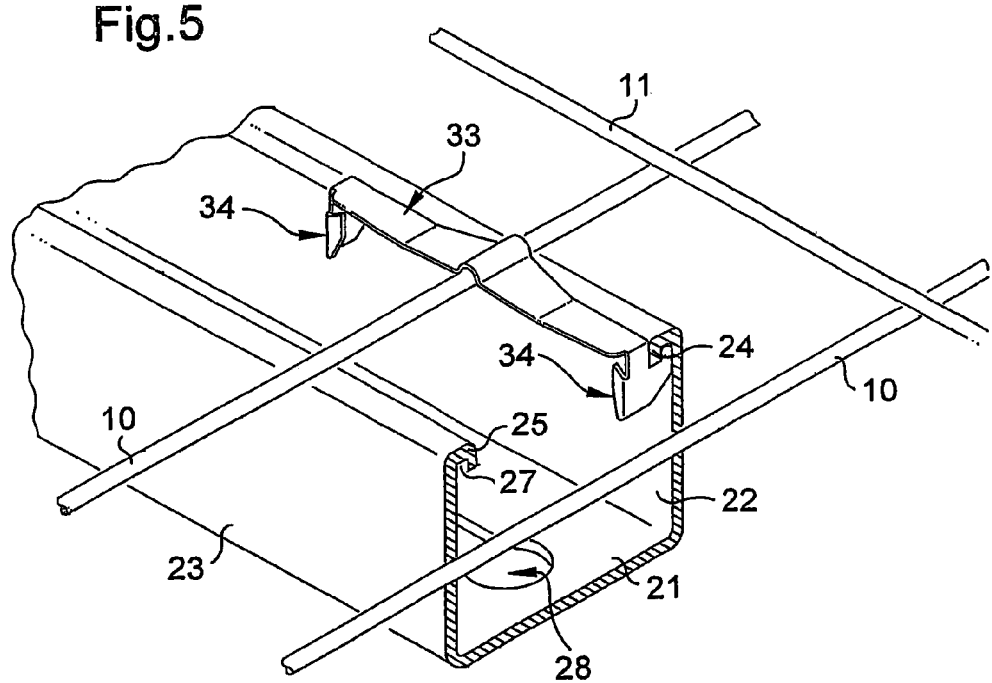
FIG. 5 is a view analogous to FIG. 4 showing the fixing of a mesh cable tray to the open face of the FIG. 4 section by means of the device of the invention.

Another advantage of the connecting device of the invention results from the fact that, the free edges of the flanges or returns 22, 23 of the section 20 having a rim 24, 25 defining channels 26 and 27, the connecting device may be used for fixing a mesh structure to the free edges of the flanges 22, 23 of the section, as shown in FIG. 5, the fingers 39 of the connecting device being received into the channels 26, 27. Note that here this fixing may be effected anywhere along the axis of the section and regardless of the distance between the longitudinal wires 10.

The invention claimed is:

1. Fixing device that can be used to fix a wire to a support member having a first surface provided with at least one opening, said device being made of elastic sheet-metal and comprising a cut-out body of one-piece construction which is bent into a U-shape, said body comprising a web and two flanges whose ends are generally T-shaped, wherein a crossbar of the T-shaped ends has a first arm shaped to bear on a second surface of the support member that is opposite the first surface at the edge of an opening and a second arm opposite the first arm and shaped differently from said first arm whose sheet metal is bent toward an opposite one of the flanges, and wherein the first arm has, on a portion nearest a stem of the T-shape, a notch defining a finger.

2. Fixing device that can be used to fix a wire to a support member having a first surface provided with at least one opening, said device being made of elastic sheet-metal and comprising a cut-out body of one-piece construction which is bent into a U-shape, said body comprising a web and two flanges whose ends are generally T-shaped, wherein a crossbar of the T-shaped ends has a first arm shaped to bear on a second surface of the support member that is opposite the first surface at the edge of an opening and a second arm opposite the first arm and shaped differently from said first arm whose sheet metal is bent toward an opposite one of the flanges, and wherein the second arm, on an edge facing toward a stem of the T-shape, includes a fastening tooth.

3. Fixing device in combination with a support member, the fixing device being used to fix a wire to the support member, the support member being for a wire mesh cable tray and having a first surface provided with at least one opening, said device being made of elastic sheet-metal and comprising a cut-out body of one-piece construction which is bent into a U-shape, said body comprising a web and two flanges whose ends are generally T-shaped, wherein a crossbar of the T-shaped ends has a first arm shaped to bear on a second surface of the support member that is opposite the first surface at the edge of an opening and a second arm opposite the first arm and shaped differently from said first arm whose sheet metal is bent toward an opposite one of the flanges, and wherein each opening of the support member has a globally circular portion into which opens a narrow portion of elongate shape.

4. The fixing device according to claim 3, wherein the crossbar has a transverse width greater than the width of the narrow portion of each opening.

5. The fixing device according to claim 3, wherein the crossbar has an inclined portion to facilitate inserting one of the two arms into an opening.

6. The fixing device according to claim 3, wherein the support member has a U-section and includes returns having free edges with a rim defining channels adapted to receive fingers on the flanges of the fixing device.

7. Fixing device that can be used to fix a wire to a support member having a first surface provided with at least one opening, wherein the device is made of elastic sheet-metal and comprises a cut-out body of one-piece construction which is bent into a U-shape, said body comprising a web and two flanges whose ends are T-shaped, at least one arm of the T of each end being adapted to bear on a second surface of the support member that is opposite the first surface at the edge of an opening, and wherein the web has over at least a portion of its length a central and very wide V-shape whose bottom includes a trough adapted to receive the wire to be fixed.

8. The fixing device according to claim 7, wherein a crossbar of the T-shape has an inclined edge portion to facilitate inserting one of the two arms into an opening.

9. The fixing device of claim 7 in combination with the support member, the support member being for a wire mesh cable tray.

10. The fixing device according to claim 9, wherein the support member has a U-section with a web that includes the first surface with plural openings.

11. The fixing device according to claim 10, wherein each opening of the support member has a globally circular portion into which opens a narrow portion of elongate shape.

12. The fixing device according to claim 11, wherein a crossbar of the T-shape of each flange has a transverse width in the first plane greater than the width of the narrow portion of each opening.

13. Fixing device that can be used to fix a wire to a support member having an exterior surface provided with at least one opening, said device being made of elastic sheet-metal and comprising a body of one-piece construction, said body comprising a web having a central recess shaped to receive a wire and a flange at each end of the web, each flange having a first engagement structure projecting generally perpendicularly away from a first side of the web and shaped to engage an edge of a support that extends parallel to the web, and a second engagement structure dissimilar to the first engagement structure that projects generally toward the central recess of the web and is shaped to engage an interior surface of the support adjacent a circular recess through which the flange passes.

* * * * *